United States Patent
Nam et al.

(10) Patent No.: US 9,480,927 B2
(45) Date of Patent: Nov. 1, 2016

(54) PORTABLE TERMINAL WITH MUSIC PERFORMANCE FUNCTION AND METHOD FOR PLAYING MUSICAL INSTRUMENTS USING PORTABLE TERMINAL

(71) Applicant: Samsung Electronics Co., Ltd., Gyeonggi-do (KR)

(72) Inventors: Myoung Ji Nam, Seoul (KR); Byung Sung Kim, Gyeonggi-do (KR); Joong Sam Yun, Incheon (KR); Sung Su Kim, Gyeonggi-do (KR); Seung Hye Yoo, Seoul (KR); Tae Yong Kim, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 509 days.

(21) Appl. No.: 13/904,407

(22) Filed: May 29, 2013

(65) Prior Publication Data
US 2013/0283159 A1  Oct. 24, 2013

Related U.S. Application Data

(62) Division of application No. 12/777,458, filed on May 11, 2010, now Pat. No. 8,539,368.

(30) Foreign Application Priority Data

May 11, 2009  (KR) .................. 10-2009-0040963

(51) Int. Cl.
*A63F 13/00* (2014.01)
*A63F 13/20* (2014.01)
(Continued)

(52) U.S. Cl.
CPC ......... *A63F 13/814* (2014.09); *A63F 13/2145* (2014.09); *A63F 13/426* (2014.09);
(Continued)

(58) Field of Classification Search
CPC ........ A63F 13/00; A63F 13/20; A63F 13/21; A63F 13/24; A63F 2009/2408; A63F 2009/241; G10H 2230/015; G10H 2220/091; G10H 2220/096; G10H 2220/145; G10H 2220/241; G10H 1/0025; G10H 1/0041; G06F 3/048; G06F 3/0487; G06F 3/0488
See application file for complete search history.

(56) References Cited

U.S. PATENT DOCUMENTS

| 5,574,843 A | 11/1996 | Gerlach, Jr. |
| 5,690,496 A | 11/1997 | Kennedy |

(Continued)

FOREIGN PATENT DOCUMENTS

KR  10-2007-0019090 A  2/2007

OTHER PUBLICATIONS

Geiger, Gunter, "Using the Touch Screen as a Controller for Portable Computer Music Instruments," Proceedings of the 2006 International Conference on New Interfaces for Musical Expression, Jun. 2006, pp. 61-64.*

*Primary Examiner* — Eric J Bycer
(74) *Attorney, Agent, or Firm* — Cha & Reiter, LLC.

(57) ABSTRACT

Disclosed are a portable terminal with a music performance function and a method for playing a variety of musical instruments. The method includes: selecting a particular piece of music and a particular musical instrument from the portable terminal, according to a user request, and executing a music performance mode corresponding to the selected musical instrument; detecting a first input signal input to a screen according to the selected musical instrument in the musical performance mode; determining, if the first input signal is detected, whether a second input signal for executing audio source data is detected; analyzing the first and second input signals, in association with each other; and outputting audio source data of the selected music, according to the analyzed result, via audio signals.

12 Claims, 19 Drawing Sheets

(51) Int. Cl.

| | | |
|---|---|---|
| *A63F 13/21* | (2014.01) | |
| *A63F 13/24* | (2014.01) | |
| *A63F 9/24* | (2006.01) | |
| *G10H 1/00* | (2006.01) | |
| *G06F 3/048* | (2013.01) | |
| *G06F 3/0487* | (2013.01) | |
| *G06F 3/0488* | (2013.01) | |
| *A63F 13/814* | (2014.01) | |
| *A63F 13/54* | (2014.01) | |
| *A63F 13/2145* | (2014.01) | |
| *A63F 13/426* | (2014.01) | |
| *G06F 3/01* | (2006.01) | |
| *G06F 3/0485* | (2013.01) | |
| *G06F 3/0486* | (2013.01) | |
| *G06F 3/0481* | (2013.01) | |
| *G06F 3/0482* | (2013.01) | |
| *G10H 7/00* | (2006.01) | |
| *A63F 13/235* | (2014.01) | |
| *A63F 13/533* | (2014.01) | |
| *A63F 13/92* | (2014.01) | |
| *A63F 13/5375* | (2014.01) | |

(52) U.S. Cl.
CPC .............. *A63F 13/54* (2014.09); *G06F 3/011* (2013.01); *G06F 3/016* (2013.01); *G06F 3/017* (2013.01); *G06F 3/0481* (2013.01); *G06F 3/0482* (2013.01); *G06F 3/0485* (2013.01); *G06F 3/0486* (2013.01); *G06F 3/04883* (2013.01); *G06F 3/04886* (2013.01); *G10H 1/0008* (2013.01); *G10H 7/004* (2013.01); *A63F 13/00* (2013.01); *A63F 13/20* (2014.09); *A63F 13/21* (2014.09); *A63F 13/235* (2014.09); *A63F 13/24* (2014.09); *A63F 13/533* (2014.09); *A63F 13/5375* (2014.09); *A63F 13/92* (2014.09); *A63F 2009/241* (2013.01); *A63F 2009/2408* (2013.01); *G06F 3/048* (2013.01); *G06F 3/0487* (2013.01); *G06F 3/0488* (2013.01); *G10H 1/0025* (2013.01); *G10H 1/0041* (2013.01); *G10H 2220/091* (2013.01); *G10H 2220/096* (2013.01); *G10H 2220/145* (2013.01); *G10H 2220/241* (2013.01); *G10H 2230/015* (2013.01)

(56) References Cited

U.S. PATENT DOCUMENTS

| | | |
|---|---|---|
| 6,515,211 B2 | 2/2003 | Umezawa et al. |
| 6,740,802 B1 | 5/2004 | Browne, Jr. |
| 7,394,012 B2 | 7/2008 | Schultz |
| 7,906,720 B2 | 3/2011 | Delorme |
| 8,237,042 B2 | 8/2012 | Scharfeld |
| 2006/0011044 A1* | 1/2006 | Chew .............................. 84/609 |
| 2006/0027080 A1 | 2/2006 | Schultz |
| 2006/0060068 A1 | 3/2006 | Hwang et al. |
| 2006/0180006 A1* | 8/2006 | Kim ................................ 84/609 |
| 2007/0180978 A1 | 8/2007 | Ozaki et al. |
| 2008/0280680 A1 | 11/2008 | Dutilly et al. |
| 2009/0051667 A1* | 2/2009 | Park ....................... G06F 3/016 345/173 |
| 2009/0165633 A1* | 7/2009 | Kyuma et al. ................. 84/610 |
| 2010/0009750 A1 | 1/2010 | Egozy et al. |
| 2010/0033426 A1 | 2/2010 | Grant et al. |
| 2010/0206156 A1 | 8/2010 | Scharfeld |

\* cited by examiner

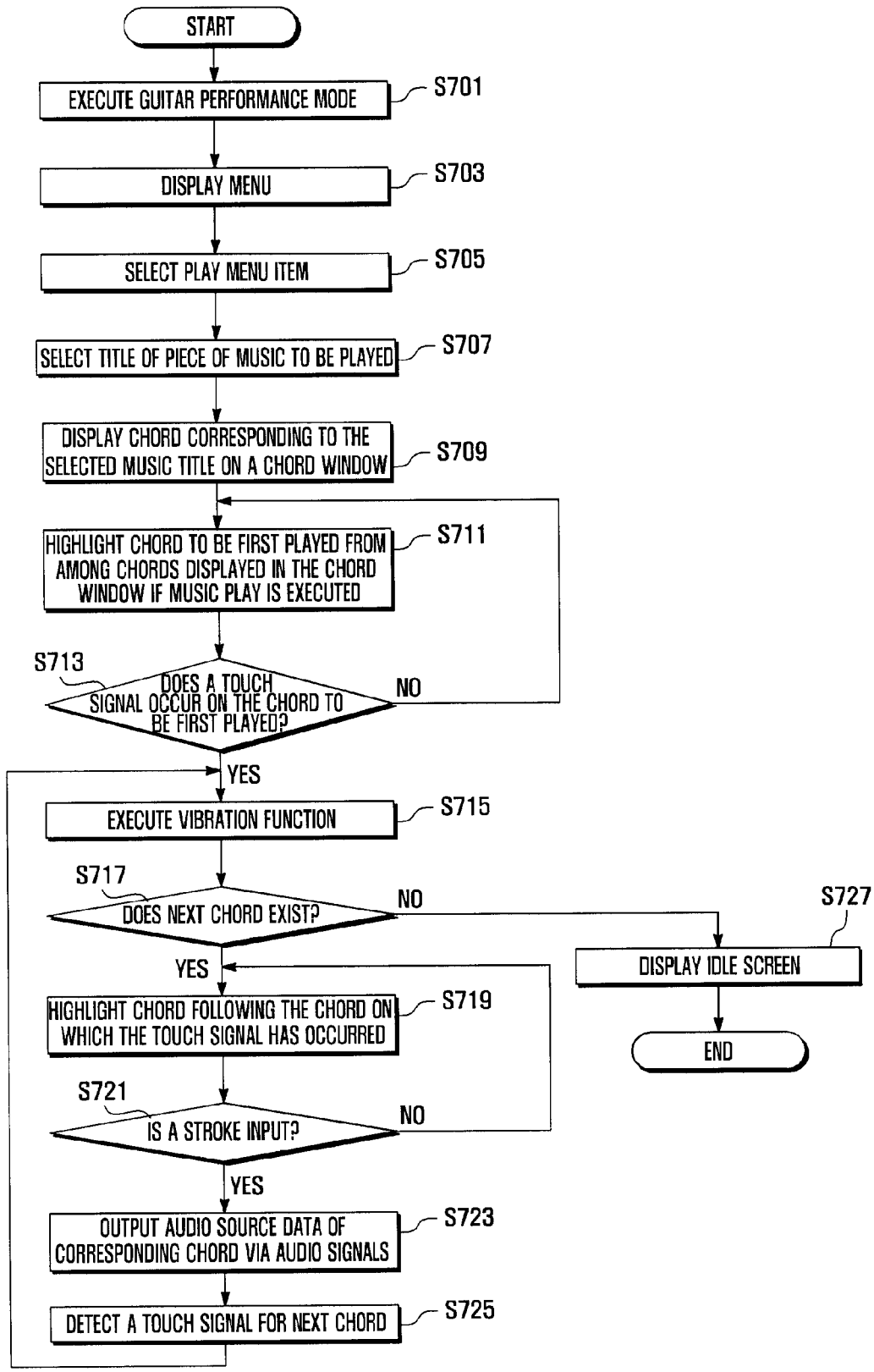

PORTABLE TERMINAL WITH MUSIC PERFORMANCE FUNCTION AND METHOD FOR PLAYING MUSICAL INSTRUMENTS USING PORTABLE TERMINAL

CLAIM OF PRIORITY

This application is a Divisional of U.S. patent application Ser. No. 12/777,458, filed on May 11, 2010 and issued as U.S. Pat. No. 8,539,368 on Sep. 17, 2013, which claims the benefit of priority under 35 U.S.C. §119(a) of an earlier Korean patent application filed in the Korean Intellectual Property Office on May 11, 2009 and assigned Serial No. 10-2009-0040963, the entire disclosure of which is hereby incorporated by reference.

BACKGROUND OF THE INVENTION

1. Field of the Invention

The present invention relates to portable terminals, and more particularly, to a portable terminal with a music performance function, and a method for playing a variety of musical instruments, through corresponding applications, in the portable terminal.

2. Description of the Related Art

With the development of technologies related to portable terminals, the portable terminals can provide a variety of functions. For example, in addition to a call function, these terminals can provide functions including a camera function, a digital broadcast receiver function, a wireless Internet function, a short message service (SMS) function, a multimedia message service (MMS) function.

In recent years, portable terminals have developed to further provide additional functions. For example, they can allow a user to select a music file and then play music corresponding to the selected music file.

However, in response to a user input such conventional portable terminals just sound one simple note of a musical instrument for a bit box or a game rather than allowing the user play music. Although conventional portable terminals have provided a music performance function, the function is significantly different from a method for playing a real musical instrument. That is, the conventional musical instrument playing method plays music by pressing the keys of the portable terminal. When a user uses a music performance function provided from a portable terminal, a system is required to provide the user with the same feel as a real musical instrument.

SUMMARY OF THE INVENTION

The present invention provides a portable terminal for performing an instrument playing function and a method for playing musical instruments using the portable terminal.

The present invention further provides a portable terminal for playing a string instrument performance function using its infrared sensor and a method for playing a string instrument using the portable terminal.

The present invention further provides a portable terminal for playing a brass instrument performance function using a microphone and a method for playing a brass instrument using the portable terminal.

The present invention further provides a portable terminal to which a plurality of applications of a variety of instruments are applied and a method for playing instruments using the portable terminal, so that users can play in concert using the portable terminals.

In accordance with an exemplary embodiment of the present invention, the present invention provides a method for playing musical instruments using a portable terminal, including: selecting a particular piece of music and a particular musical instrument from the portable terminal; executing a music performance mode corresponding to the selected musical instrument; while executing the music performance mode, detecting a first input signal input to a screen according to the selected musical instrument; determining, when the first input signal is detected, whether a second input signal for executing audio source data is also detected; analyzing the first input signal and the second input signal to produce an analyzed result of thereof in association with each other; and outputting audio source data of the selected particular piece of music and particular musical instrument, according to the analyzed result, via audio signals.

In accordance with another exemplary embodiment of the present invention, the present invention provides a portable terminal having a music performance function, including: a touch screen for detection of a first input signal as a touch signal, input to a screen, according to musical instruments, in a musical instrument mode; a sensing unit for detection of a user's stroke motion by an infrared sensor; an audio processing unit for detection of a user's audio signal input to a microphone; and a controller for detection of a second input signal comprising one of the touch signal o the stroke motion and the user's audio signal, analysis of the first input signal and the second input signal in association with each other to produce an analyzed result, and output of audio source data of a particular piece of music, based on the analyzed result, via an audio signal.

BRIEF DESCRIPTION OF THE DRAWINGS

The features and advantages of the present invention will become more apparent from the following detailed description in conjunction with the accompanying drawings, in which:

FIG. 7 illustrates a flow chart that describes a method for playing a guitar using a portable terminal, according to an exemplary embodiment of the present invention;

DETAILED DESCRIPTION OF THE INVENTION

Figure 1:
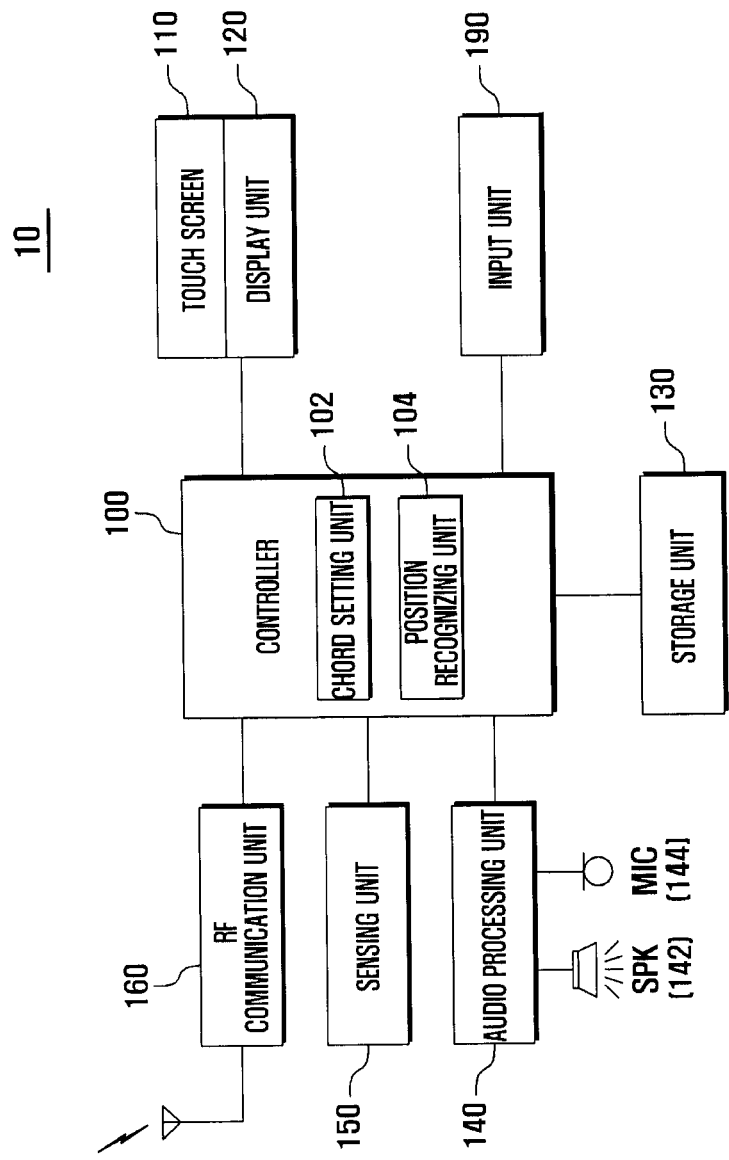
FIG. 1 is a schematic block diagram illustrating a portable terminal with a music performance function, according to an exemplary embodiment of the present invention.

Hereinafter, exemplary embodiments of the present invention are described in detail with reference to the accompanying drawings. The same reference numbers are used throughout the drawings to refer to the same or similar parts. For the purposes of clarity and simplicity, detailed descriptions of well-known functions and structures incorporated herein may be omitted to avoid obscuring the subject matter of the present invention.

The terms or words described in the present description and the claims should not be limited by a general or lexical meaning, instead should be analyzed as a meaning and a concept through which the inventor defines and describes the present invention as his most effective way for implementation thereof, to comply with the idea of the present invention. Therefore, one skilled in the art will understand that the embodiments disclosed in the description and configurations illustrated in the drawings are only exemplary embodiments, instead there may be various modifications, alterations, and equivalents thereof to replace the exemplary embodiments at the time of filing this application.

The term 'musical instrument(s)' refers to string instruments, brass instruments, etc., which can be played using a portable terminal. An example of a string instrument is a guitar. Examples of the brass instruments are a trumpet and a trombone. The guitar can be played by a touch signal, generated as a user touches the touch screen on which a chord of a piece of music selected by the user is displayed, and a stroke signal generated as an infrared sensor detects the user's hand motion. The trumpet can be played by a touch signal, generated as the user touches trumpet buttons for notes of a piece of music selected by the user, and an audio signal that the user inputs via a microphone. The trombone can be played by a drag touch signal, generated as the user performs a dragging motion changing a touch position on the touch screen, corresponding to a note of the piece of music selected by the user, and an audio signal that the user inputs via the microphone.

The term 'chord' refers to musical information required to play a guitar. A chord is any set of harmonically related notes (C, D, E, F, G, A, B, C). The notes comprise a scale. Each note may be raised or lowered by a semitone or half step.

The term 'stroke' refers to a motion that is detected by an infrared sensor when the guitar is played using the portable terminal. That is, a stroke is detected by the infrared sensor when the user moves his/her hand. The stroke generates an input signal that allows audio source data corresponding to a touched note to be output as an audio signal.

The term 'audio source data' refers to data used to generate and output audio signals corresponding to notes of the piece of music, played according to the user's inputs.

The term 'button' refers to a type of icon displayed on the touch screen when the trumpet is played using the portable terminal. Similar to a piano keyboard that allows the user to play the piece of music using his/her touch signals, each button is composed of a note within one octave. That is, the buttons are displayed on the touch screen of the portable terminal and represent the notes of one octave.

The term 'positions' refer to areas on the touch screen, which correspond to seven touch bars representing positions of a scale when the trombone is played through the portable terminal. In order to play the trombone, the user performs a dragging operation on the touch bars of the positions, which generates drag touch signals according to the positions, and thus inputs different notes of the scale according to the drag touch signals.

In an exemplary embodiment of the present invention, the piece of music is composed by the user and set with corresponding chords by measures. The piece of music to be played, as a file, can be downloaded to the portable terminal, through a music information providing service, according to a user request. In an alternative exemplary embodiment, the downloaded music file further contains information regarding the elements of the piece of music, including length, note, timbre, and rhythm.

In an exemplary embodiment of the present invention, if the section of the piece of music, selected by the user, is not displayed in one entire screen, the piece of music may be displayed on the screen using a scrolling/sliding method according to a user performance speed of a musical instrument.

In an exemplary embodiment of the present invention, the portable terminal stores data of the played piece of music and may transmit the store data to other portable terminals. This function can be performed through one of an MMS service and a registered server that is connected to the Internet network/communication network, and can also be achieved using any of a short range wireless communication, an infrared data association (IrDA) communication, a Bluetooth® communication, and a Zigbee® communication.

In an exemplary embodiment of the present invention, although the portable terminal according to the present invention is described based on a terminal equipped with a touch screen and a music performance function, it will be appreciated that the portable terminal can be applied to devices including all information communication devices, and multimedia devices, and to applications thereof, for example, an application including any of a mobile communication terminal, a personal digital assistant (PDA), an international mobile telecommunication 2000 (IMT-2000) terminal, a smart phone, a portable multimedia player (PMP), a MPEG audio layer-3 (MP3) player, a navigation system, and a laptop computer.

FIG. 1 is a schematic block diagram illustrating a portable terminal having a music performance function, according to an exemplary embodiment of the present invention.

Referring to FIG. 1, the portable terminal 10 includes a controller 100, a touch screen 110, a display unit 120, a storage unit 130, an audio processing unit 140, a sensing unit 150, an RF communication unit 160, and an input unit 190. The controller 100 includes a chord setting unit 102 and a position recognizing unit 104.

The touch screen 110 detects a touch event, which corresponds to a touch at a position on the touch screen, on a particular image displayed on the display unit 120 and outputs it to the controller 100. The touch screen 110 generates a touch down signal, a drag touch signal, a touch up signal, etc. The touch down signal is generated when one of a user finger and a particular object contacts, i.e., touches, the touch screen 110. The drag touch signal is generated when one of the user finger and a particular object is dragged and moved, i.e., the touches from one point to another, on the touch screen at a certain speed in a certain direction. The touch up signal is generated when the touch is removed from the touch screen 110. In an exemplary embodiment of the present invention, the touch screen 110 detects touch signals for the selection of the title of a piece of music to be played, and a musical instrument, a performance mode, and also touch signals to play the selected music title with the selected musical instrument, and outputs them to the controller 100. For example, if the touch signal is generated on a chord window in the touch screen 110, showing a chord, when the user plays a guitar using a portable terminal 10, the touch screen 110 transfers a coordinate value corresponding to a location thereon of where the touch signal has occurred to the controller 100. In addition, if a touch signal is generated on the touch screen 110 showing buttons of an octave when a user plays a trumpet using the portable terminal 10, the touch screen 110 transfers a coordinate value corresponding to the location where the touch signal has occurred to the controller 100. Likewise, if a user plays a trombone using the portable terminal 10, the touch screen 110 transfers a coordinate value corresponding to the touch signal input to a touch bar displaying a position to the controller 100.

The display unit 120 displays screens including any of an idle state screen, a screen for showing one selected from among a plurality of contents stored in the storage unit 130, a screen for showing a user's data, and a screen for showing optional functions. The display unit 120 may be implemented with a liquid crystal display (LCD). If the display unit 120 is implemented with a touch screen, it may also serve as an input device. In an exemplary embodiment of the present invention, the types of screens displayed on the display unit 120 include a screen for selecting kinds of musical instruments, a screen for showing a list of titles of pieces of music to be played as background music, an initial screen according to a selected musical instrument, a screen for showing, if a guitar has been selected, a chord to be played in a composition mode, a screen for inputting a title of a piece of music composed by a user, a screen for showing a chord of a piece of music selected by a user, and a screen for highlighting a chord following a currently played chord,. Furthermore, if a trumpet is played using the portable terminal 10, the display unit 120 can display a screen for highlighting a button following a button corresponding to a currently played note. In addition, if a trombone is played using the portable terminal 10, the display unit 120 can display a screen for highlighting a position following a position corresponding to a currently played note.

The storage unit 130 stores application programs required to execute functions according to the present invention, and data generated as the programs are executed. The storage unit 130 comprises a program area and a data area.

The program area stores executable programs including an operating system (OS) for booting up the portable terminal 10, an application program for converting a piece of music, selected in a musical instrument performance mode, to a guitar chord, an application program for recognizing a chord that is dragged and input to a chord window, an application program for determining the sequence of chords input to a chord window, an application program for producing a vibration if a user touch signal generates a chord to be played, an application program for outputting audio source data according to a corresponding chord, an application program for associating audio source data of a corresponding note with an octave, according to a touch signal that is input to the button of the trumpet, and for outputting it, an application program for outputting audio source data of a note corresponding to a position of the trombone, and an application program for determining the strength of an audio signal input by a user.

The data area stores data including data used and generated as the portable terminal 10 is used. For example, the data area stores audio source data according to titles and chords of pieces of music composed by a user and audio source data of a piece of music played by the user.

The audio processing unit 140 performs functions including reproduction of audio signals, output from the controller 100, and transfer of audio signals, input via a microphone 144, to the controller 100. That is, the audio processing unit 140 converts voice and audio data to an audible sound and outputs it via speaker 142, under the control of the controller 100. The audio processing unit 140 also converts audio signals input via the microphone 144 to audio data and then transfers it to the controller 100. In an exemplary embodiment of the present invention, the audio processing unit 140 outputs audio data, corresponding to a note played by a user, as audio signals under the control of the controller 100. The audio processing unit 140 also measures the intensity of an audio signal input by a user and then transfers the measured intensity to the controller 100. The audio signals are used to output audio data, associated with notes input by user touch signals when the user plays a trumpet or a trombone using the portable terminal 10. The audio signals can also be used to raise or lower a note by one of a semitone and a half-step when playing one of the trumpet and the trombone.

The sensing unit 150 detects and analyzes a physical signal input from the outside and outputs the detected and analyzed signal to the controller 100. The physical signal is caused by one of a user motion and an object movement. The sensing unit 150 may be implemented with one of a plurality of sensors, including an acceleration sensor, a temperature sensor, a geomagnetic sensor, a horizontal sensor, and an infrared sensor. In an exemplary embodiment of the present invention, the sensing unit 150 of the portable terminal 10 is implemented using an infrared sensor. The infrared sensor is categorized into a passive infrared sensor and an active infrared sensor. The active infrared sensor radiates infrared light to an object and detects the infrared light reflected therefrom. The passive infrared sensor detects infrared light radiated by one or more object in a field of view of the passive infrared sensor. Then active infrared sensor comprises an infrared light emitting diode (LED) and a detector. When a musical instrument performance mode is executed, the active infrared sensor is operated in such that its infrared LED emits a certain amount of infrared light and its detector detects whether infrared light is emitted. For example, if the detector detects infrared light emitted by the infrared LED, the sensing unit 150 identifies that a user stroke motion has been input and then requests the performance of a guitar by the controller 100.

The RF communication unit 160 establishes an RF communication channel between the portable terminal 10 and a base station and allows signals to be transmitted/received therethrough. The RF communication unit 160 is configured to include an RF transmitter for up-converting the frequency of transmitted signals and amplifying the transmitted signals and an RF receiver for low-noise amplifying received RF signals and down-converting the frequency of the received RF signals. In an exemplary embodiment of the present invention, the RF communication unit 160 enables the portable terminal 10 to download information regarding a user requested piece of music from a base station via RF Internet communication. The RF communication unit 160 can also enable the portable terminal 10 to transmit audio source data of the user performed piece of music to another portable terminal via RF communication.

The input unit 190 receives a plurality of types of information, including numbers and texts, signals to set a plurality of functions, and signals to control functions of the portable terminal 10, and outputs these types to the controller 100. The input unit 190 can generate signals according to user motions. To this end, the input unit 190 may be implemented with at least one of a keypad and a touch pad. The input unit 190 may be integrated with the display unit 120, via a touch panel which may be a part of a touch screen. In that case, the touch panel simultaneously serves as an input device and a display device.

The controller 100 controls the entire operation of the portable terminal 10 and also signal flows among the elements therein. In an exemplary embodiment of the present invention, the controller 100 executes a musical instrument performance mode according to a user request and outputs audio source data corresponding to a note of a selected instrument via an audio signal. To this end, the portable terminal 10 may store information regarding musical instruments, including a trumpet and a trombone. The controller 100 can also store music information identified by instrument type, received from any of another system and downloaded from a server according to a user request.

If the user has selected a guitar, the controller 100 can identify a chord corresponding to a position on the touch screen 110 where a user touch signal occurred and can determine the sequence of the chords located in a chord window according to a successive drag touch signal input by the user. The controller 100 controls the display unit 120 to display chords of a piece of music composed by the user. If a touch signal occurs at a portion of the display unit 120, on which a chord to be played is displayed, the controller 100 activates a vibration function and allows the user to recognize whether he/she correctly touches a chord. After that, the controller 100 controls the audio processing unit 140 to output audio source data corresponding to the touched chord according to the user stroke signal input via the sensing unit 150. For example, the controller 100 can sort the intensities of the audio signals by preset steps. In that case, the controller 100 can output the audio source data corresponding to notes input by the user, associated with the intensities of the audio signals sorted by preset steps.

If the user has selected the trumpet, the controller 100 controls the display unit 120 to display buttons of the trumpet. The buttons are arrayed as a keyboard of the piano, displaying notes of one octave (a scale). The octave may be altered according to notes of a piece of music to be played. The controller 100 may control the display unit 120 to display information regarding an octave on one side of the screen. The controller 100 can detect audio signals input via the microphone 144 and measure the intensity of the input audio signals. After that, the controller 100 can control the audio processing unit 140 to output the audio source data, associated with the intensity of the audio signal according to a note corresponding to a button input by the user.

If the user has selected the trombone, the controller 100 controls the display unit 120 to display a touch bar. The touch bar may be composed of seven positions. The controller 100 can identify a note corresponding to a position according to a drag touch signal input by the user. The controller 100 can detect audio signals input via the microphone 144 and differentiate the intensity of the input audio signals. After that, the controller 100 can control the audio processing unit 140 to output the audio source data, associated with the intensity of the audio signal according to a note corresponding to a position input by the user.

In order to efficiently execute controlling operations described above, in an exemplary embodiment the controller 100 may further include a chord setting unit 102 and a position recognizing unit 104.

The chord setting unit 102 serves to set chords for a particular piece of music when the portable terminal 10 is set to execute a guitar performance mode. The chord setting unit 102 can identify chords of a piece of music composed by the user and store them in the storage unit 120 according to the input sequence.

The position recognizing unit 104 serves to determine whether a touch is dragged on the touch bar displayed on the display unit 120 when the portable terminal 10 is executed in a trombone performance mode. The position recognizing unit 104 controls the audio processing unit 140 to output audio source data, by matching coordinate values of seven positions of the touch bar with notes of a piece of music.

In an exemplary embodiment of the present invention, the controller 100 controls the display unit 120 to highlight any of a displayed plurality of chords, buttons, and touch bars corresponding to notes of a piece of music played in a background music mode, and detects a touch signal to detect the chords, buttons, and touch bars. When the controller 100 detects a stroke signal according to one of a user motion and an audio signal, the controller 100 outputs audio source data corresponding to the corresponding one of chord, button or touch bar selected by the touch signal. If the user motion does not match a rhythm of a piece of background music, the controller 100 may not output audio source data of the piece of background music according to an original rhythm. In that case, the controller 100 controls the audio processing unit 140 to adjust the rhythm of the piece of background music according to the user performance motion and to output the rhythm-adjusted audio source data. That is, after the controller 100 receives a user touch signal and then ascertains that one of a stroke signal and an audio signal has been received, it outputs corresponding audio source data. After that, the controller 100 proceeds with and plays the next portion of the piece of music being played.

Figure 2:
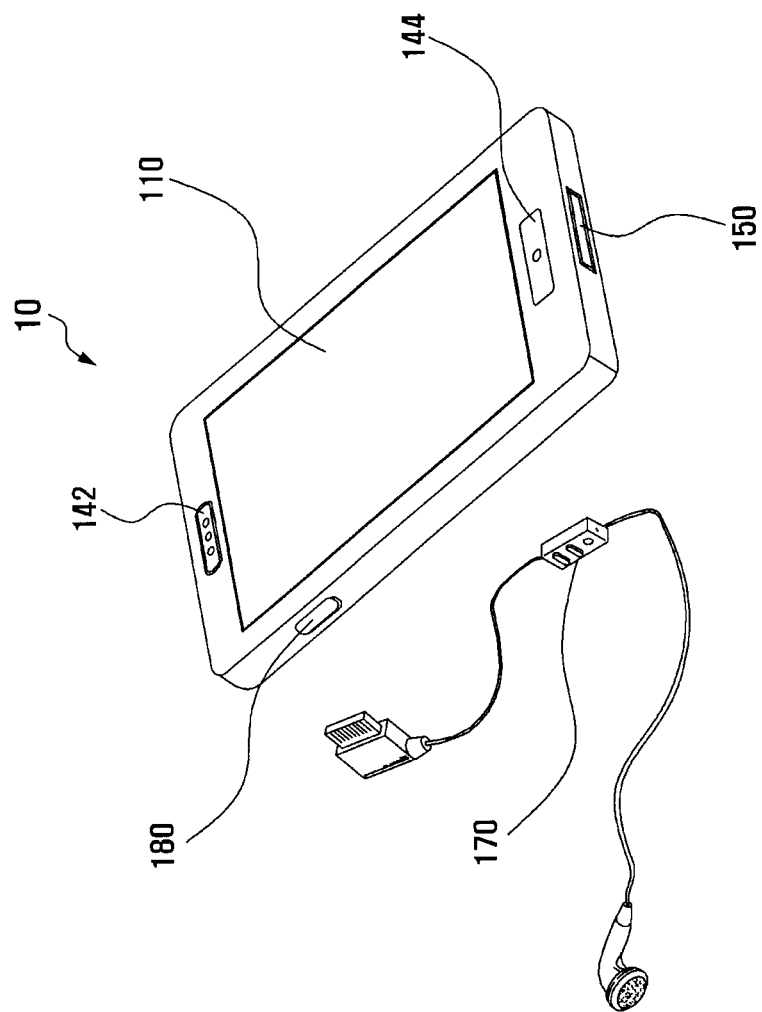
FIG. 2 is a view illustrating the appearance of a portable terminal with a music performance function, and its accessories, according to an exemplary embodiment of the present invention.

FIG. 2 is a view illustrating an appearance of a portable terminal 10 with a music performance function, and its accessories, according to an exemplary embodiment of the present invention.

Referring to FIG. 2, the portable terminal 10 includes a touch screen 110, a sensing unit 150, a speaker (SPK) 142, a microphone (MIC) 144, and an earphone connecting unit 180. The earphone connecting unit 180 may be connected to an earphone having an external microphone 170. In an exemplary embodiment of the present invention, although the sensing unit 150, speaker 142, microphone 144 and earphone connecting unit 180 are configured to be installed in the portable terminal 10 as shown in FIG. 2, it should be understood that the present invention is not limited to the exemplary embodiment. For example, they may be located at the other side of the portable terminal 10.

The touch screen 110 converts a coordinate where a touch has occurred and then changes the coordinate into a touch signal and then outputs it to the controller 100. The display unit 120 is attached to the touch screen 110 and displays the notes of a scale and at least one chord, serving as information regarding a piece of music that the user plays using a musical instrument.

In a state where the user has selected a guitar from among instruments provided by the portable terminal 10, if the portable terminal 10 detects a touch signal input at a location of a particular chord displayed on the display unit 120, the portable terminal 10 determines whether the sensing unit 150 detects a user stroke signal. If the portable terminal 10 determines that the sensing unit 150 has detected a user stroke signal, it can output audio source data, which corresponds to a chord displayed at a location where the touch signal has occurred, as an audio signal.

In a state where the user has selected a trumpet from among instruments provided by the portable terminal 10, if the portable terminal 10 detects a touch signal input at a location of a particular button displayed on the display unit 120, the portable terminal 10 measures the intensity of an audio signal input to the microphone 144. After that, the portable terminal 10 outputs audio source data, associating a note corresponding to the button according to the intensity of the audio signal with the audio signal, to the speaker 142, as an audio signal.

In a state where the user has selected a trombone from among instruments provided by the portable terminal 10, if the portable terminal 10 detects a touch signal input at a particular position of at least one touch bar displayed on the display unit 120, the portable terminal 10 measures the intensity of an audio signal input to the microphone 144. After that, the portable terminal 10 outputs audio source data, associating a note corresponding to the particular position according to the intensity of an audio signal with the audio signal, to the speaker 142. Alternatively, the intensity of the audio signal can be detected by the user audio signal input to the external microphone 170 connected to the earphone.

In the following description, a method explains to play a musical instrument by the portable terminal 10. Although the following exemplary embodiment of the present invention is explained based on a particular musical instrument, it should be understood that the present invention is not limited to the following exemplary embodiment. That is, it will be appreciated that the present invention can be applied to a plurality of musical instruments and pieces of music and sources of music.

Figure 3:
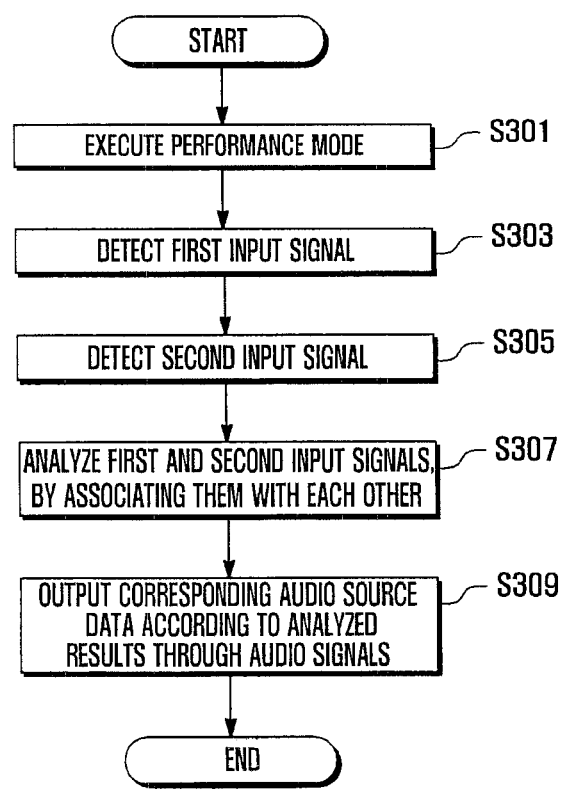
FIG. 3 illustrates a flow chart that describes a method for operating a portable terminal with a music performance function according to an exemplary embodiment of the present invention.
Figure 4:
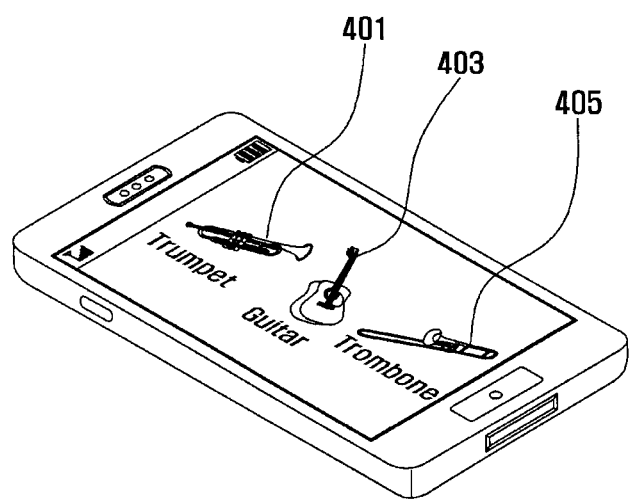
FIG. 4 is a view illustrating a portable terminal that performs a music performance function, according to an exemplary embodiment of the present invention.

FIG. 3 illustrates a flow chart that describes a method for operating a portable terminal 10 with a music performance function according to an exemplary embodiment of the present invention. FIG. 4 is a view illustrating a portable terminal 10 that executes a music performance function, according to an exemplary embodiment of the present invention.

Referring to FIGS. 3 and 4, the controller 100 of the portable terminal 10 executes a musical instrument performance mode according to a user request (S301). When the musical instrument performance mode has been executed, the controller 100 can identify an executing mode according to a user selected instrument. That is, the controller 100 can display types of musical instruments played in the portable terminal 10 on the screen in a musical instrument performance mode. As shown in FIG. 4, in an exemplary embodiment of the present invention, the controller 100 displays a list of musical instruments played in the portable terminal 10, with musical instrument icons, such as, a guitar 401, a trumpet 403, and a trombone 405. Although the exemplary embodiment of the present invention is explained based on the instruments, such as a guitar, a trumpet, and a trombone, it should be understood that the present invention is not limited to the exemplary embodiment. It will be appreciated that the portable terminal 10 can be implemented to play all types of musical instruments.

The controller 100 can also display a list of at least one piece of music that can be played by a particular musical instrument, on the screen. The list of at least one piece of music may include at least one piece of music directly composed by the user and at least one piece of music downloaded from an external system via the RF communication unit 160. Alternatively, the list of music may be a list of at least one piece of music stored in the portable terminal 10 during the manufacture of the portable terminal 10.

When the user selects one of the at least one piece of music from the list and inputs a touch signal to the touch screen to play the selected piece of music with a particular musical instrument, the controller 100 detects the touch signal, as a first input signal, input in the touch screen 110 (S303). The controller 100 analyzes the input touch signal and executes a corresponding function. If the controller 100 ascertains that the touch signal has occurred at a location to select a particular musical instrument displayed on the touch screen 110, it may control the portable terminal 10 to execute a vibration function.

If the controller 100 detects the first input signal, it can determine whether to detect a second input signal (S305). The second input signal may be one of a stroke signal, input to the sensing unit 150 of the portable terminal 10, and an audio signal input via the microphone 144 of the audio processing unit 140. The stroke signal may be input to the sensing unit 150 by one of a user hand and a particular device. The audio signal may be a user voice input to the microphone 144.

When the controller 100 detects the first and second input signals, it analyzes them, by associating them with each other (S307). More specifically, if the controller 100 detects the first input signal and then the second input signal, it outputs audio source data of a corresponding original piece of music according to the first and second input signals. That is, if the controller 100 detects a touch signal as the first input signal, input after information regarding a particular musical instrument is displayed on the screen of the portable terminal 10, and then a stroke signal, as the second input signal, input to the sensing unit 150, it enables the particular musical instrument to be played according to the first and second input signals. Alternatively, if the controller 100 detects a touch signal as the first input signal, input after information regarding a particular musical instrument is displayed on the screen of the portable terminal 10, and then an audio signal, as the second input signal, input to the audio processing unit 140, it controls the audio processing unit 140 to play the particular musical instrument according to the first and second input signals.

After that, the controller 100 outputs corresponding audio source data based on the analysis result acquired at step S307 (S309). The controller 100 can output audio source data corresponding to notes of the selected piece of music according to the instruments.

Figure 5:
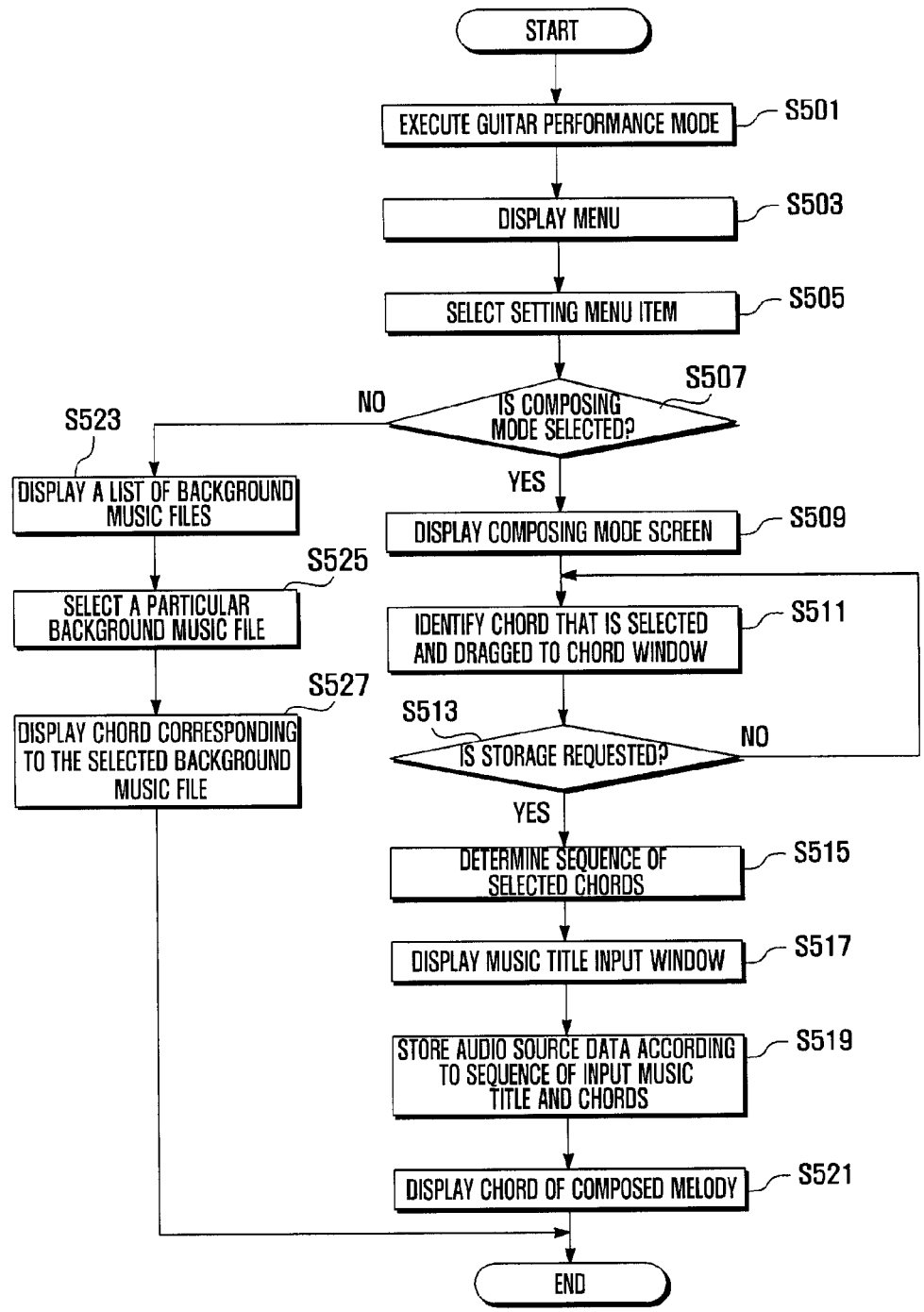
FIG. 5 illustrates a flow chart that describes a method for setting a chord to operate a guitar performance mode in a portable terminal, according to an exemplary embodiment of the present invention.

FIG. 5 illustrates a flow chart that describes a method for setting a chord to operate a guitar performance mode in the portable terminal 10, according to an exemplary embodiment of the present invention. FIG. 6A to FIG. 6H illustrate screens that describe a method for setting a chord to operate the guitar performance mode in a portable terminal 10, according to an exemplary embodiment of the present invention.

Figure 6A:
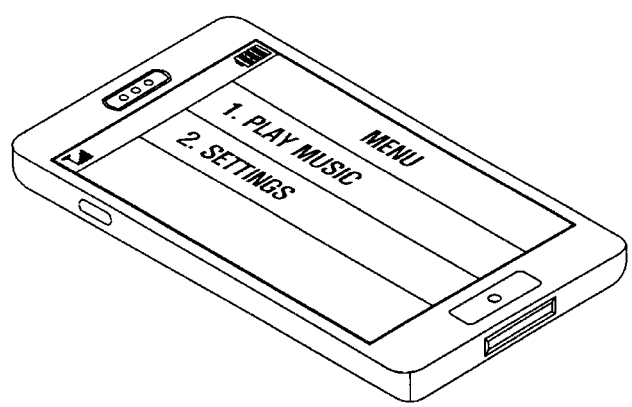
FIGS. 6A, 6B, 6C, 6D, 6E, 6F, 6G and 6H illustrate screens that describe a method for setting a chord to operate a guitar performance mode in a portable terminal, according to an exemplary embodiment of the present invention.

Referring to FIG. 5 and FIGS. 6A to 6H, the controller 100 executes the guitar performance mode according to a user operation (S501). In the guitar performance mode, the user can directly play the guitar virtually provided by the portable terminal 10. When the guitar performance mode has been executed at S501, the controller 100 controls the display unit 120 to display a menu related to the guitar performance mode on the screen (S503). For example, as illustrated in FIG. 6A, the controller 100 controls the display unit 120 to display a menu containing items, '1. Play music' and '2. Settings' on the screen.

Figure 6B:
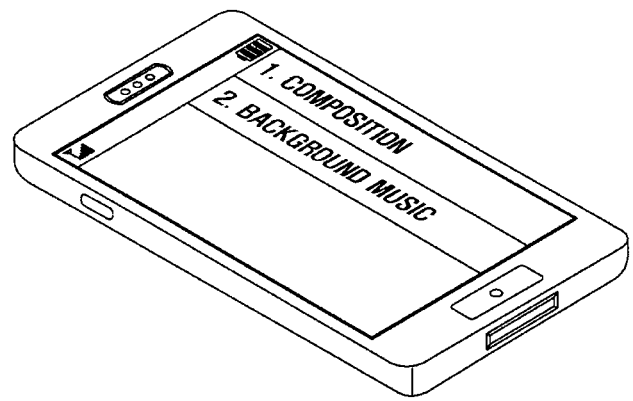
Figure 6C:
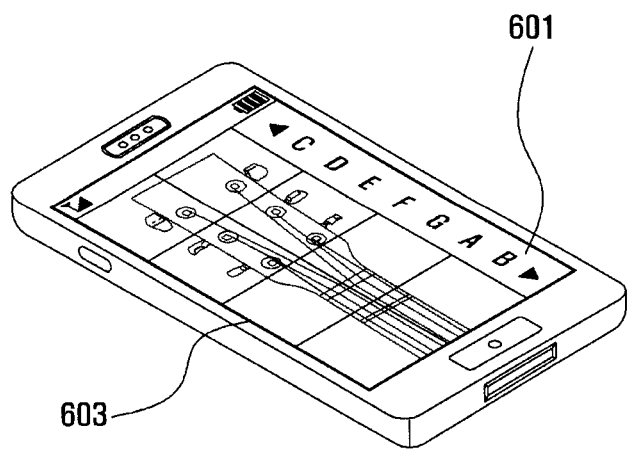

After that, the controller 100 detects whether the settings menu is selected (S505). If the settings menu is selected at S505, the controller 100 controls the display unit 120 to display a submenu containing a composition mode and a background music mode on the screen as illustrated in FIG. 6B, and then determines whether the composition mode is selected (S507). The composition mode refers to a mode that allows the user to compose a melody, by directly viewing a sheet of music, selecting a chord, and dragging the chord to a chord window. The background music mode refers to a mode that displays chords of a piece of music stored in the portable terminal 10 on the screen so that the user can play the chords. The pieces of music executed in the background music mode may be pieces of music that are one of downloaded from an external system and composed by the user and stored in the portable terminal 10. If the controller 100 ascertains that the composition mode has been selected at S507, it controls the display unit 120 to display a screen corresponding to the composition mode (S509). For example, as shown in FIG. 6C, the controller 100 controls the display unit 120 to display a chord bar 601 and a chord window 603 to compose a piece of music using the guitar. The chord bar 601 includes C-, D-, E-, F-, G-, A-, and B-chords, and also accidentals to one of raise and lower a chord by a semitone or half step. If the chord bar 601 cannot display all the chords at once on the screen, the controller 100 can display the chord bar 601 in a scroll/slide format. The chord window 603 refers to an area where chords selected by a user are located in order and may be composed of a plurality of regions.

Figure 6D:
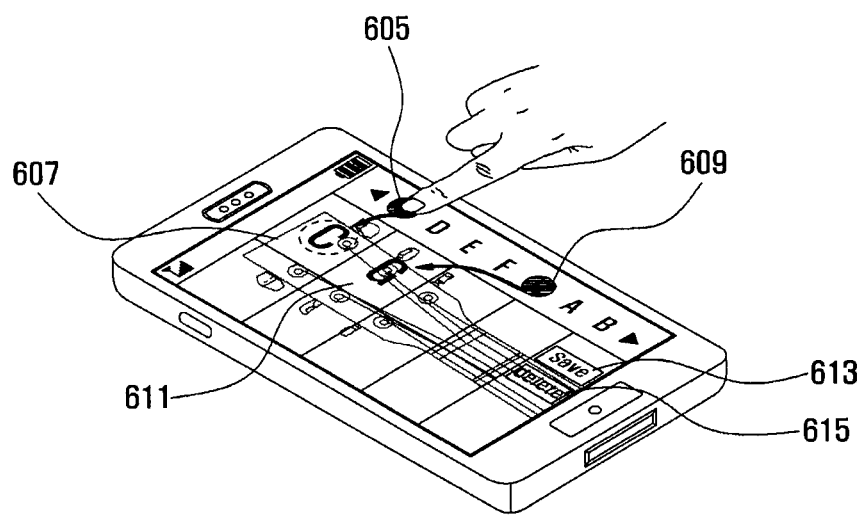

After that, the controller 100 detects that a chord, selected from among the chords located in the chord bar 601, is moved to a particular region of the chord window 603 according to a user drag signal, and identifies the moved chord (S511). The controller 100 determines whether a signal for storing the identified note is requested (S513). If a signal for storing the identified chord has been requested at S513, the controller 100 determines the sequence of the selected chords (S515). When the user executes the music performance function, the controller 100 controls the audio processing unit 140 to play a piece of music according to the sequence of the chords. For example, as illustrated in FIG. 6D, the controller 100 can detect touch signals to drag the C chord 605 to the first region 607 in the chord window 603 and then the G chord 609 to the second region 611. After that, the controller 100 determines whether a touch signal corresponding to a user storage request occurs on a storage key 613. If the controller 100 determines that a touch signal corresponding to a user storage request has occurred, it stores the selected chords. As such, the user can compose a piece of music containing the chords using the portable terminal 10. Meanwhile, the controller 100 can detect whether a touch signal to delete a user selected chord, located in a particular region in the chord window 603, occurs on a deletion key 615. For example, if a touch signal has occurred on the deletion key 615, the controller 100 deletes a chord selected from the chords located in the chord window. Likewise, if a user drags a chord from one region in the chord window to another, the controller 100 determines that a deletion signal has been generated and then deletes the dragged chord from the region.

Alternatively, if the controller 100 determines that a signal for storing the identified chord has not been requested at S513, it returns to and proceeds with step S511.

Figure 6E:
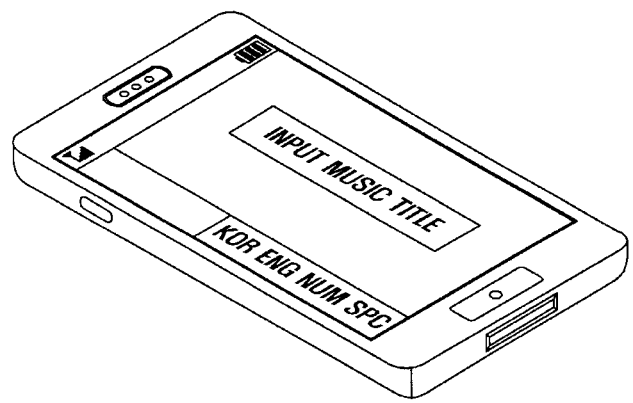

Next, the controller 100 receives the title of a piece of music composed by the user (S517). For example, as shown in FIG. 6E, if a piece of music composed by the user is requested to be stored, the controller 100 displays an input field to receive the title of the piece of music on the screen.

When the user inputs the title of the piece of music at S517, the controller 100 identifies the user input music title and the chords in order, and stores corresponding audio source data (S519). The audio source data corresponds to the order of chords and notes of chords and is output via the audio processing unit 140.

Figure 6F:
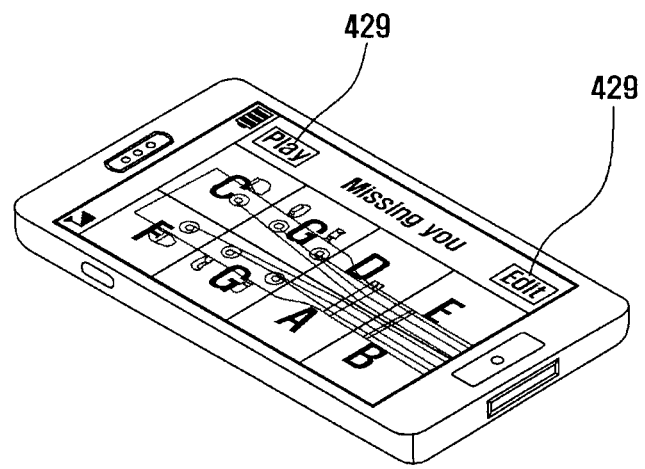

Next, the controller 100 controls the display unit 120 to display the composed piece of music on the screen (S521). For example, as illustrated in FIG. 6F, the controller 100 displays the user input chords in order and the title of the piece of music on the screen. When the controller 100 detects that the user selects the 'Play' key 617, it plays the corresponding piece of music. Likewise, when the controller 100 detects the user selects an 'Edit' key 619, it executes a music edit function.

Figure 6G:
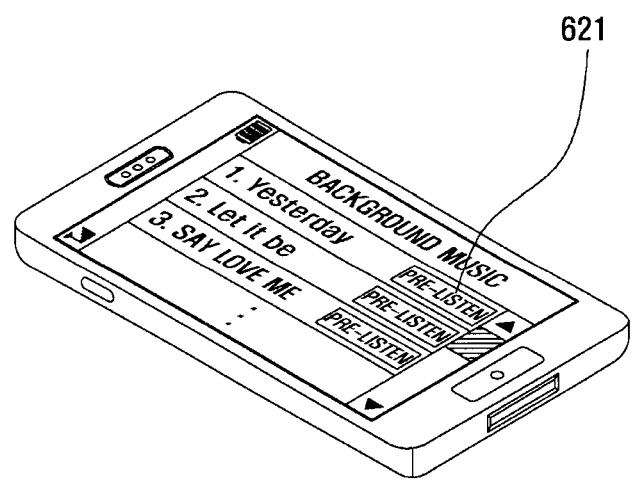

Alternatively, if the controller 100 ascertains that a composition mode has not been selected but a background music mode has been selected at S507, it controls the display unit 120 to display a list of pieces of background music on the screen (S523). For example, as illustrated in FIG. 6G, the controller 100 can display the list of pieces of music that is stored in the storage unit 130 and can be played by the guitar. If a pre-listen key 621 is selected, the controller 100 controls the audio processing unit 140 to convert audio source data of a corresponding piece of music into an audio signal and to output it.

Figure 6H:
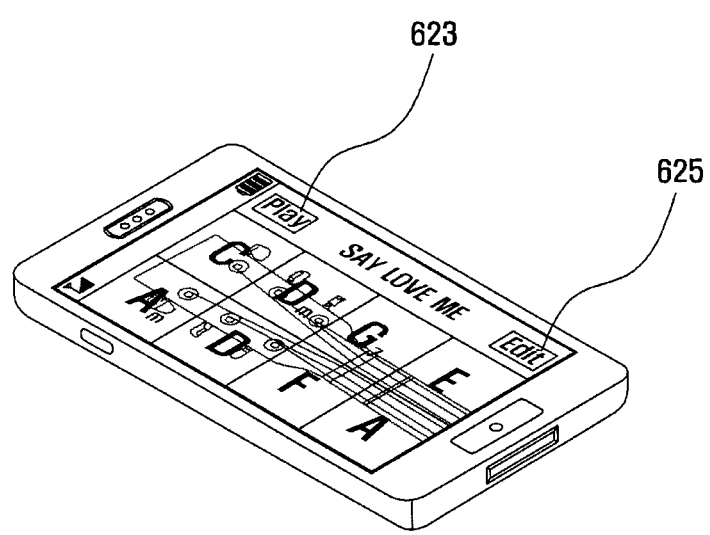

After that, the controller 100 detects a signal to select one of the pieces of background music from the list (S525). The controller 100 controls the display unit 120 to display chords corresponding to the selected background piece of music (S527). For example, as illustrated in FIG. 6H, the controller 100 controls the display unit 120 to display the chords and title of the selected piece of background music on the screen. If the controller 100 detects the input of the 'Play' key 623, it plays a corresponding piece of music. Likewise, when the controller 100 detects the input of an 'Edit' key 625, it executes a function for editing the selected piece of background music.

In an exemplary embodiment of the present invention, the controller 100 may display the degree of performance difficulty regarding respective music while displaying a list of pieces of background music. That is, the controller 100 can display the performance levels, High, Medium, and Low, and the title of the piece of music on the display unit 120.

FIG. 7 illustrates a flow chart that describes a method for playing the guitar using a portable terminal 10, according to an exemplary embodiment of the present invention. FIG. 8A to FIG. 8E illustrate screens that describe a method for playing a guitar using the portable terminal 10, according to an exemplary embodiment of the present invention.

Referring to FIG. 7 and FIGS. 8A to 8E, the controller 100 executes a guitar performance mode according to a user operation (S701). The controller 100 controls the display unit 120 to display a menu related to guitar performance on the screen (S703). For example, the controller 100 displays a menu related to guitar performance, containing items, 'Play music' and 'Settings,' on the screen.

When the controller 100 determines that 'Play music' has been selected in the menu (S705), it detects whether a signal for selecting a piece of music to be played is input (S707). In an exemplary embodiment of the present invention, the controller 100 executes a guitar performance function of the portable terminal 10 and allows a user to play one of a user-composed piece of music and one selected from the list of pieces of background music. When executing the music performance, the controller 100 activates the sensing unit 150 to detect the user stroke motion.

Figure 8A:
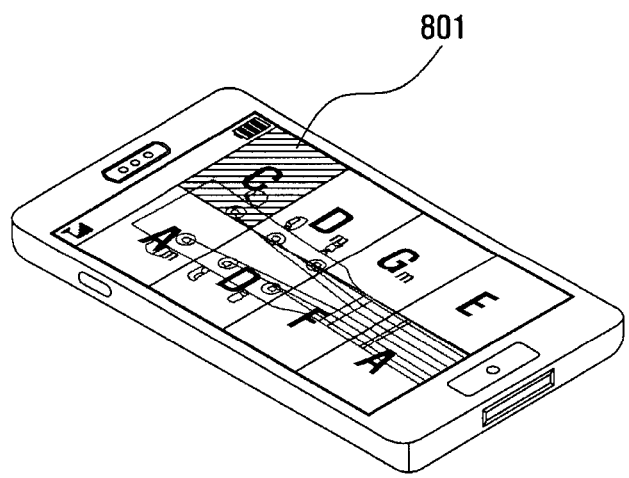
FIGS. 8A, 8B, 8C, 8D and 8E illustrate screens that describe a method for playing a guitar using a portable terminal, according to an exemplary embodiment of the present invention.

After that, the controller 100 displays chords of the selected piece of music to be played in the chord window 603 (S709). When a plurality of chords are displayed in the chord window 603, the controller 100 controls the display unit 120 to highlight the first chord of the plurality of chords to be played, displayed in the chord window 603 (S711). For example, as illustrated in FIG. 8A, the controller 100 displays a chord window showing a chord selected by the user on the screen. The controller 100 can control the display unit 120 to highlight a region of the C chord 801 to be first touched. When the chord is displayed, the controller 100 detects whether a touch signal occurs in the region of the chord to be first touched (S713). If the controller 100 determines that a touch signal occurs in the region of the chord to be first touched at S713, it controls the portable terminal 10 to generate a vibration corresponding to the touch signal (S715). That is, the controller 100 can provide feedback to the user when he/she correctly touches the region of the chord displayed on the screen. On the contrary, if the controller 100 determines that a touch signal does not occur in the region of the chord to be first touched at S713, it returns to S711 and waits until a touch signal occurs in the region of the chord.

After generating a vibration at S715, the controller 100 determines whether there is a chord following the chord where the current touch signal has occurred (S717). If the controller 100 determines that there is a chord following the chord where the current touch signal has occurred at S717, it controls the display unit 120 to highlight a chord following the chord where the current touch signal has occurred (S719).

Figure 8B:
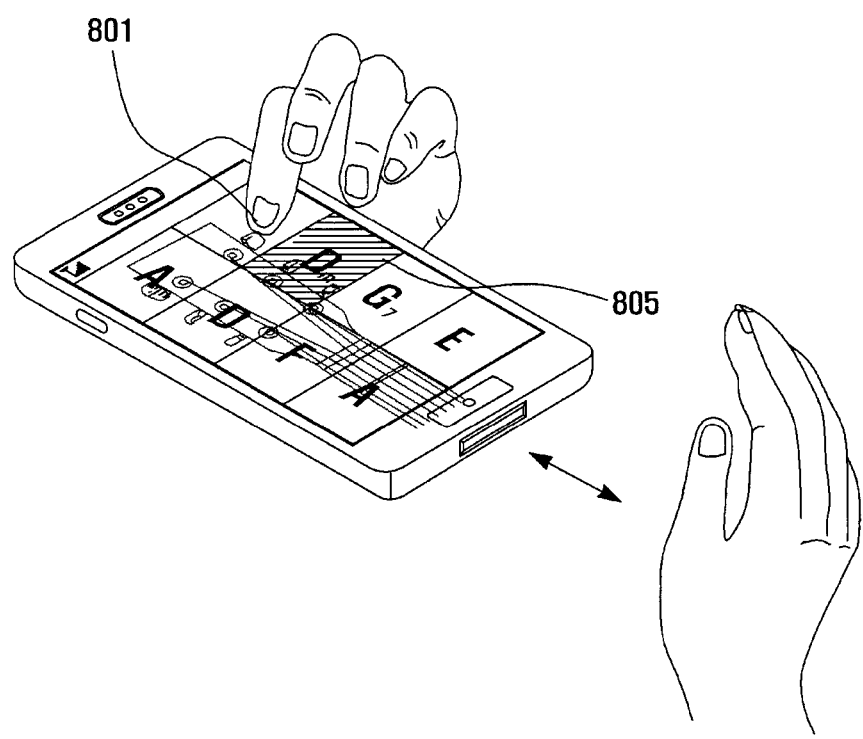
Figure 8C:
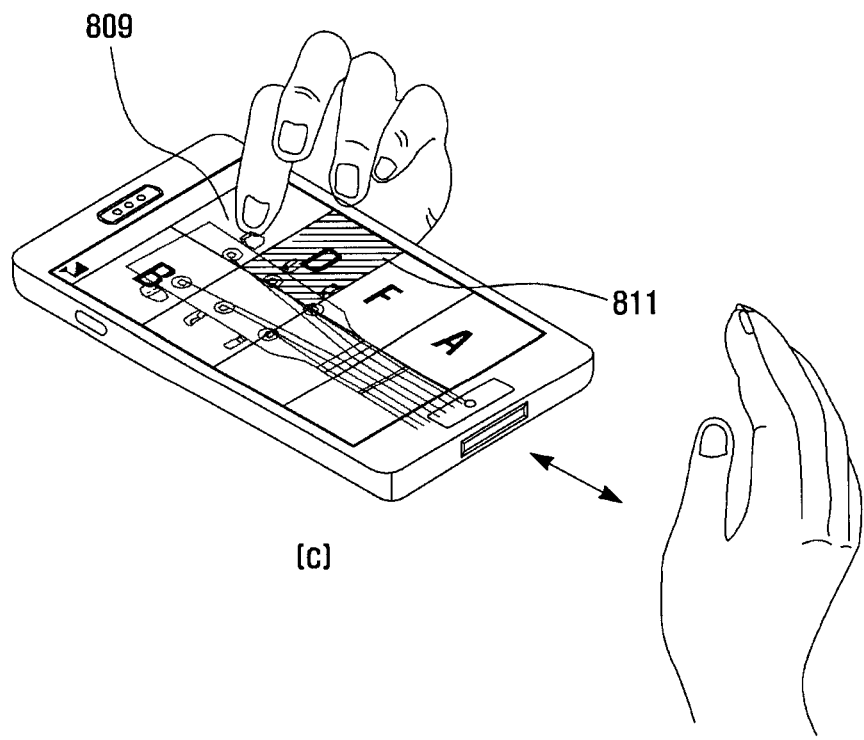

For example, as illustrated in FIG. 8B, if a chord 801 to be currently touched, 'C' chord, is touched, the controller 100 can highlight and display the following chord 805, 'Dm' chord, on the screen. Likewise, as illustrated in FIG. 8C, if a chord 809, 'Am' chord, is currently touched, the controller 100 can highlight and display the following chord 811 to be played, 'D' chord, on the screen. In an exemplary embodiment of the present invention, the controller 100 can also be operated in such a way that, when the first chord is touched, the chords located at the second line on the chord window, 'Am, D, F, and A' chords can be displayed on the first line in the chord window.

When the highlighted chord to be played is touched at 719, the controller 100 determines whether a stroke is input (S721). The input of the stroke can be detected by the sensing unit 150. The sensing unit 150 detects a user stroke input in such a way that its infrared LED radiates infrared light from a certain distance and its detector detects the changes in the infrared light reflected from the user stroke, and then outputs the detected signal to the controller 100.

When the controller 100 determines that a stroke has been input at S721, it controls the audio processing unit 140 to output audio source data corresponding to one of the stroked and touched chord (S723). The controller 100 can control the audio processing unit 140 to analyze the touch chord, extract a corresponding note, and output audio source data corresponding to the extracted note via an audio signal. Alternatively, if the controller 100 determines that a stroke has not been input at S721, it returns to step S719 where the display unit 120 highlights and displays a chord following the chord where a touch signal has occurred.

After the audio source data has been output at S723, the controller 100 detects a touch signal at the following chord to be touched (S725). When a touch signal has occurred at the following chord, the controller 100 controls the portable terminal 10 to generate a vibration to inform the user that the chord has been correctly touched.

Figure 8D:
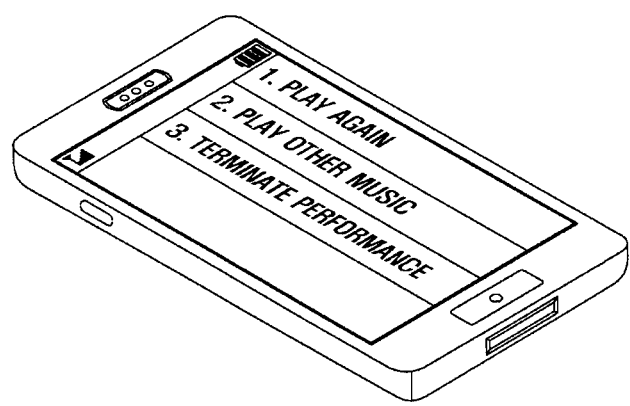

Alternatively, if the controller 100 determines that the following chord does not exist at S717, it displays a screen corresponding to an idle mode (S727). The idle mode may further include a mode asking a user whether to one of resume and terminate the music performance if the music performance has been one of finished and stopped. For example, as shown in FIG. 8D, if the portable terminal 10 is operated in an idle mode, the controller 100 can control the display unit 120 to display a list of items including 'Play again', 'Play other music' and 'Terminate performance' on the screen. After that, the controller 100 executes a function corresponding to a user selected item.

Figure 8E:
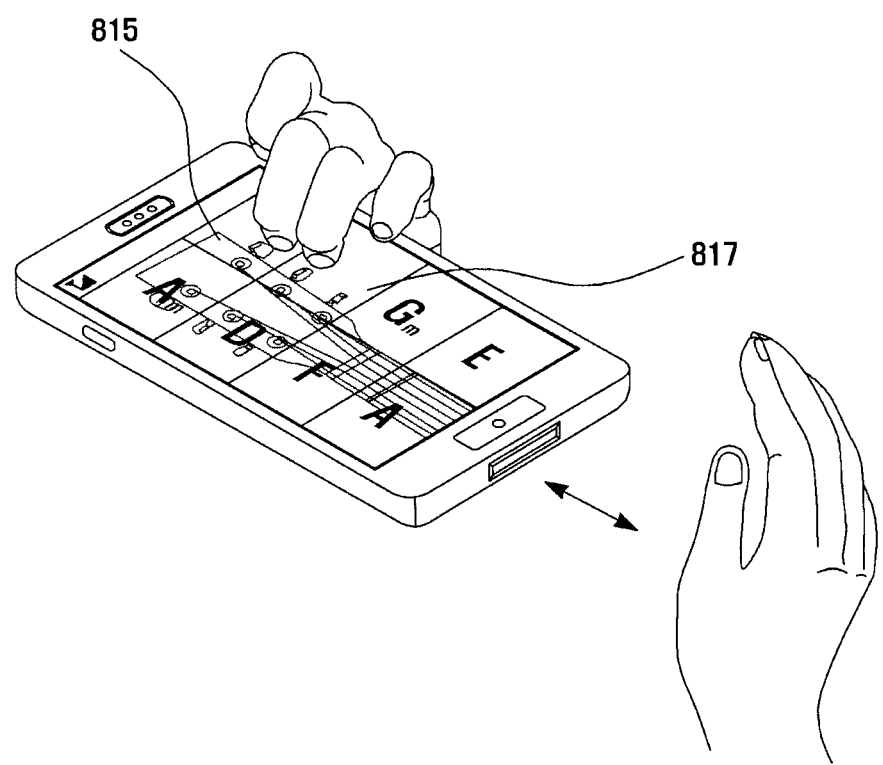

In an exemplary embodiment of the present invention, the portable terminal 10 can detect signals touching at least two chords in the chord window 603 displayed on the screen in order to play the guitar. That is, the controller 100 can detect multi-touch signals input to the touch screen 110. For example, as illustrated in FIG. 8E, the controller 100 can detect signals that simultaneously touch 'C' chord 815 and 'Dm' chord 817 displayed in the chord window. When detecting simultaneous touch signals in the regions in which the two chords are displayed, the controller 100 can identify a plurality of user stroke signals. After that, the controller 100 can output audio source data corresponding to the chords based on the identified plurality of stroke signals. The controller 100 can control the audio processing unit 140 to output audio source data corresponding to the 'C' chord 815 and then audio source data corresponding to the 'Dm' chord 817.

Figure 9:
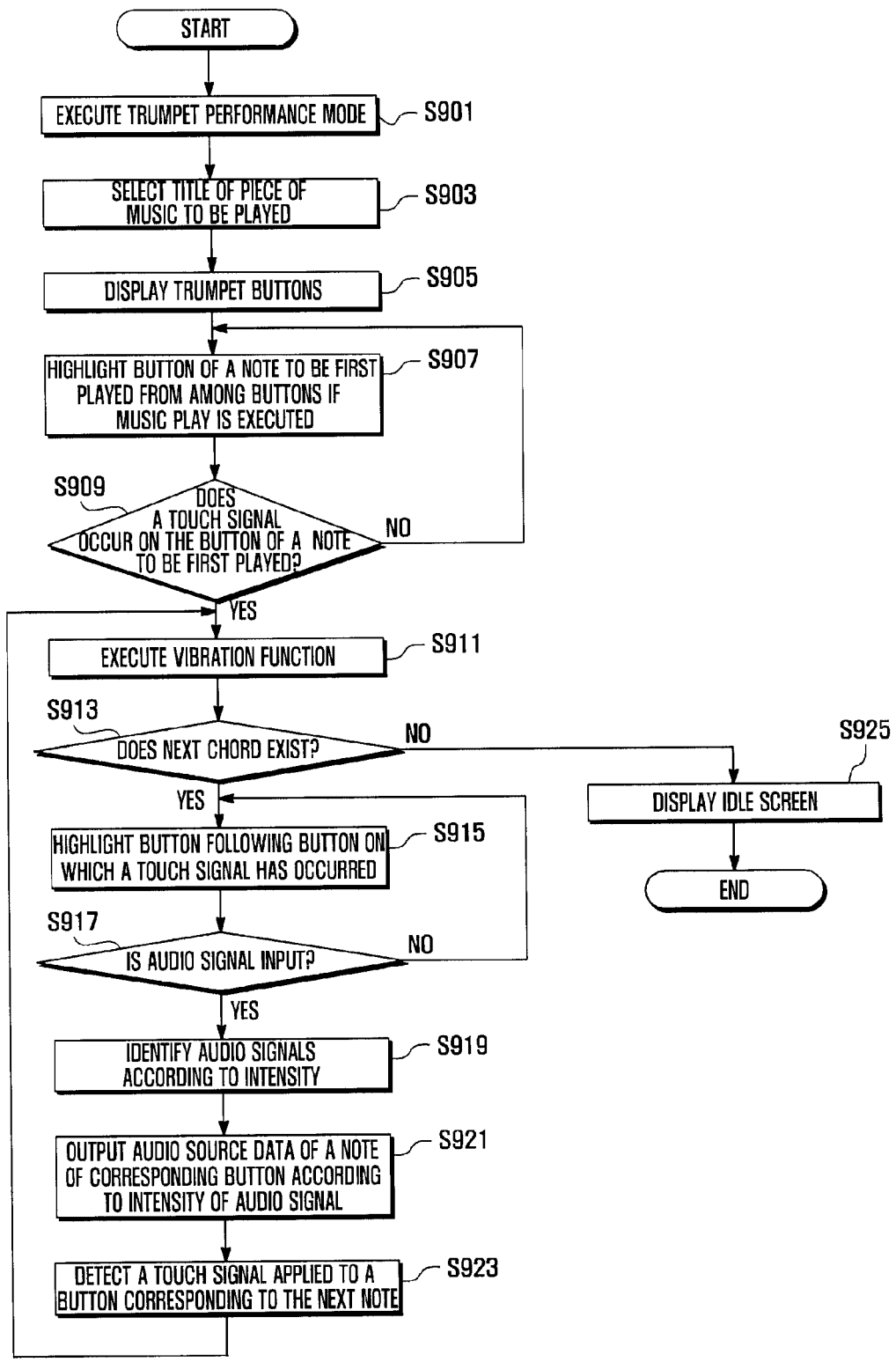
FIG. 9 illustrates a flow chart that describes a method for playing a trumpet using a portable terminal, according to an exemplary embodiment of the present invention.

FIG. 9 illustrates a flow chart that describes a method for playing a trumpet using a portable terminal 10, according to an exemplary embodiment of the present invention. FIG. 10A to FIG. 10D illustrate screens that describe a method for playing the trumpet using a portable terminal 10, according to an exemplary embodiment of the present invention.

The portable terminal 10 allows the user to play the trumpet through its musical instrument performance function, and the method for playing the trumpet is explained in detail as follows, with reference to FIG. 9 and FIGS. 10A to 10D.

Referring to FIG. 9, the controller 100 executes a trumpet performance mode according to the user selection (S901). The controller 100 can detect whether a signal for selecting a piece of music to be played is input (S903). The controller 100 can display a list of pieces of music that can be played through the trumpet and provide information regarding the pieces of music via a pre-listen function.

Figure 10A:
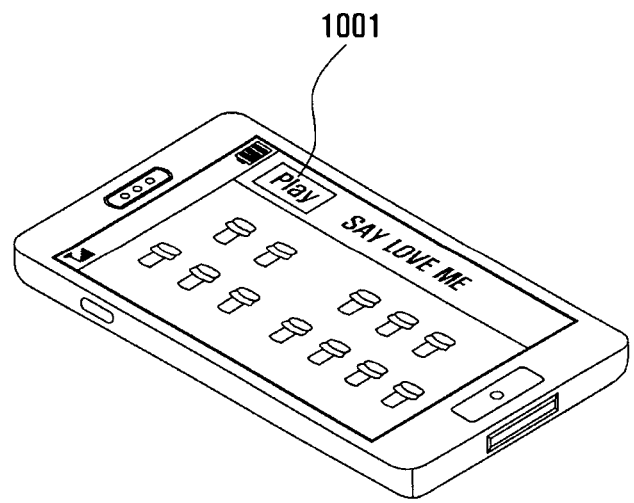
FIGS. 10A, 10B, 10C and 10D illustrate screens that describe a method for playing a trumpet using a portable terminal, according to an exemplary embodiment of the present invention.

When the piece of music to be played has been selected at S903, the controller 100 displays buttons of the trumpet on the screen (S905). The controller 100 can also display the title of the selected piece of music and a plurality of keys for playing the selected piece of music. For example, as illustrated in FIG. 10A, the controller 100 displays a plurality of buttons of the trumpet on the screen, arraying the keys in the same format as the piano keyboard for an octave. The controller 100 also displays the title of the piece of music selected by the user and the 'Play' key 1001 on the screen.

Figure 10B:
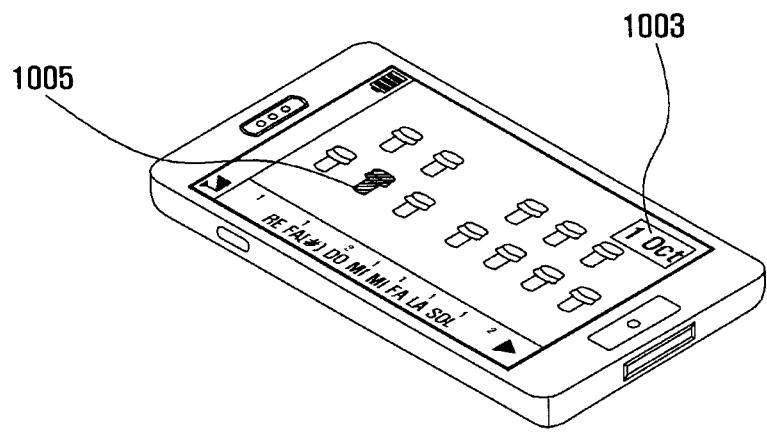

When a piece of music is played, the controller 100 controls the display unit 120 to highlight a button to be first touched from among the buttons displayed on the screen (S907). For example, as illustrated in FIG. 10B, the controller 100 highlights the button to be first touched, 'Re' button 1005. The controller 100 also displays an octave information 1003 of the piece of music that is currently being played. The controller 100 can display at least one note of the piece of music to be played on the bottom portion of the screen in a slide format.

Next, the controller 100 detects whether a touch signal occurs on the button corresponding to a note to be first touched (S909). If the controller 100 determines that a touch signal has occurred on the button at S909, it controls the portable terminal 10 to generate a vibration corresponding to the touch signal (S911). That is, the controller 100 can provide feedback to the user confirming that he/she correctly touched the button on the screen. Alternatively, if the controller 100 determines that a touch signal does not occur at the button at S909, it returns to S907 and waits until the touch signal occurs on the button.

Figure 10C:
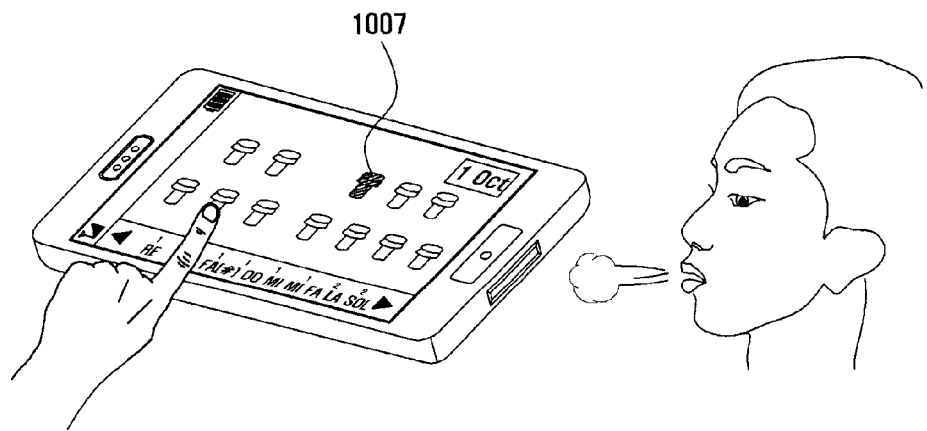

After generating a vibration at S911, the controller 100 determines whether there is a note to be played, following the note where the current touch signal has occurred (S913). If the controller 100 determines that there is a note to be played, following the note where the current touch signal has occurred at S913, it controls the display unit 120 to highlight the button of a note following the note of the button where the current touch signal has occurred (S915). For example, as illustrated in FIG. 10C, if the button 1005 to be touched, the 'Re' button, is touched, the controller 100 can highlight and display the following button 1007, the 'Fa(#)' button, on the screen.

After that, the controller 100 determines whether a user audio signal is input (S917). The user audio signal can be detected by a microphone 144 of the audio processing unit 140. When the audio signal has been detected at S917, the controller 100 can measure the intensity of the audio signal input to the microphone 144 (S919).

Next, the controller 100 can control the audio processing unit 140 to output audio source data corresponding to the button (S921). The controller 100 can control the audio processing unit 140 to analyze the touched button, extract a corresponding note, and output audio source data corresponding to the extracted note, associated with the intensity of the audio signal measured at S919. Alternatively, if the audio signal has not been detected at S917, the controller 100 returns to and proceeds with step S915 where it controls the display unit 120 to highlight the button of a note following the note of the button where the current touch signal has occurred.

When outputting audio source data according to the touched button at S921, the controller 100 detects whether the following button is touched (S923). If the following button has been touched at S923, the controller 100 returns to and proceeds with step S911 where it controls the portable terminal 10 to generate a vibration to inform the user that the button has been correctly touched.

Meanwhile, if the controller 100 ascertains that there is not a note to be played, following the note where the current touch signal has occurred at S913, it displays a screen corresponding to an idle mode (S925). The idle mode may further include a mode asking a user whether to one of resume and terminate the music performance if the music performance has one of ended and been stopped.

Figure 10D:
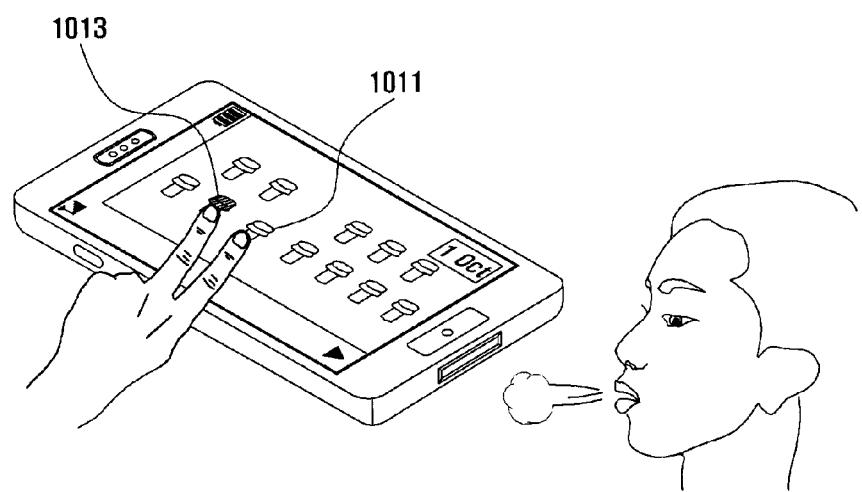

In an exemplary embodiment of the present invention, the portable terminal 10 can detect signals simultaneously touching at least two buttons displayed on the screen in order to play the trumpet. That is, the controller 100 can detect multi-touch signals input to the touch screen 110. For example, as illustrated in FIG. 10D, the controller 100 can detect signals that simultaneously touch 'Re' button 1013 and 'Mi' button 1011 displayed on the screen. When detecting simultaneous multi-touch signals on the two buttons, the controller 100 determines whether a user audio signal is input via the microphone 144 of the audio processing unit 140. After that, the controller 100 can output audio source data corresponding to the buttons based on the intensity of the audio signal. For example, the controller 100 can control the audio processing unit 140 to output audio source data corresponding to the 'Re' button 1013 and then audio source data corresponding to the 'Mi' button 1011.

In addition, in an exemplary embodiment of the present invention, the controller 100 can map a button for playing a piece of music using the trumpet function to a particular key of the input unit 190. The particular key may be a key set by one of the user and a portable terminal manufacturer. In an alternative exemplary embodiment of the present invention, the sensing unit 150 includes a horizontal sensor for sensing a horizontal deviation. The controller 100 can identify a scale according to the angle between the ground surface sensed by the sensor 150 and the location of the portable terminal 10. If a button for playing the trumpet is set as a particular key, the controller 100 can output corresponding audio source data according to the particular key signal input by the user and a horizontal angle sensed by the sensing unit 150.

The horizontal angle may be equally divided into a plurality of angles. If the buttons are mapped to keys, the buttons are set not according to the number of notes in one octave but according to the number of buttons that are used to play a real trumpet.

Figure 11:
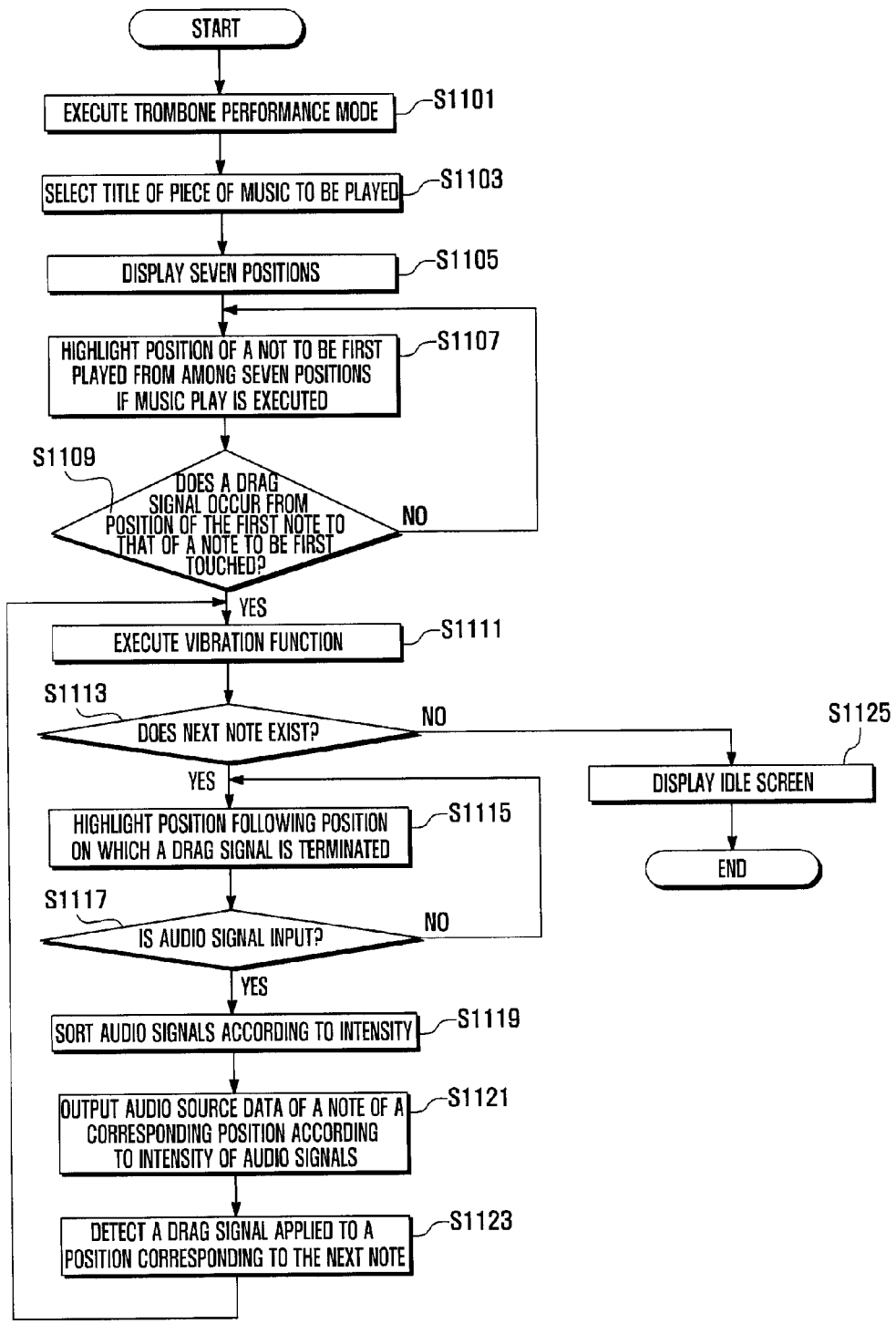
FIG. 11 illustrates a flow chart that describes a method for playing a trombone using a portable terminal, according to an exemplary embodiment of the present invention.
Figure 12A:
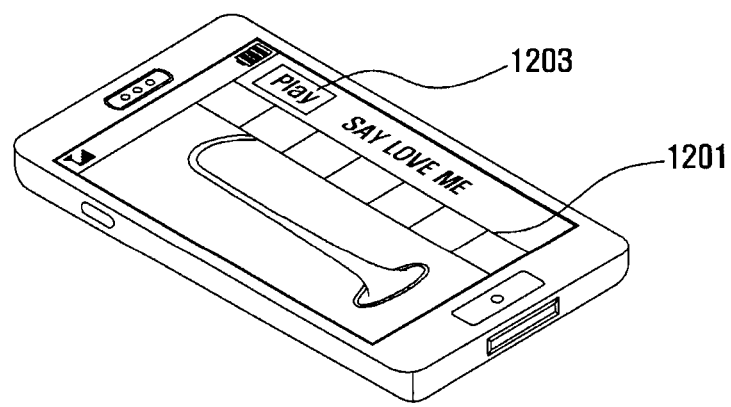
FIGS. 12A, 12B and 12C illustrate screens that describe a method for playing a trombone using a portable terminal, according to an exemplary embodiment of the present invention.
Figure 12B:
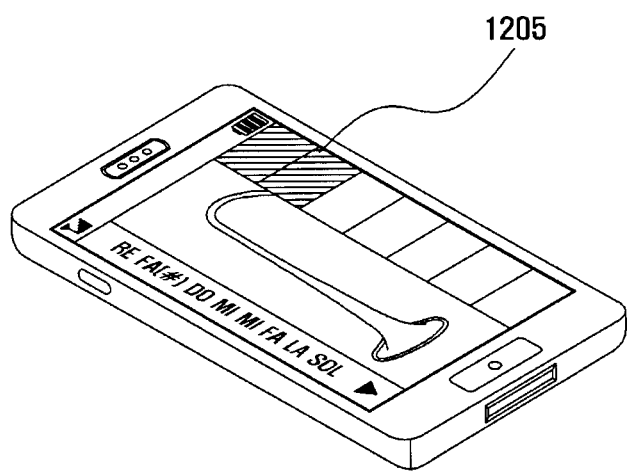
Figure 12C:
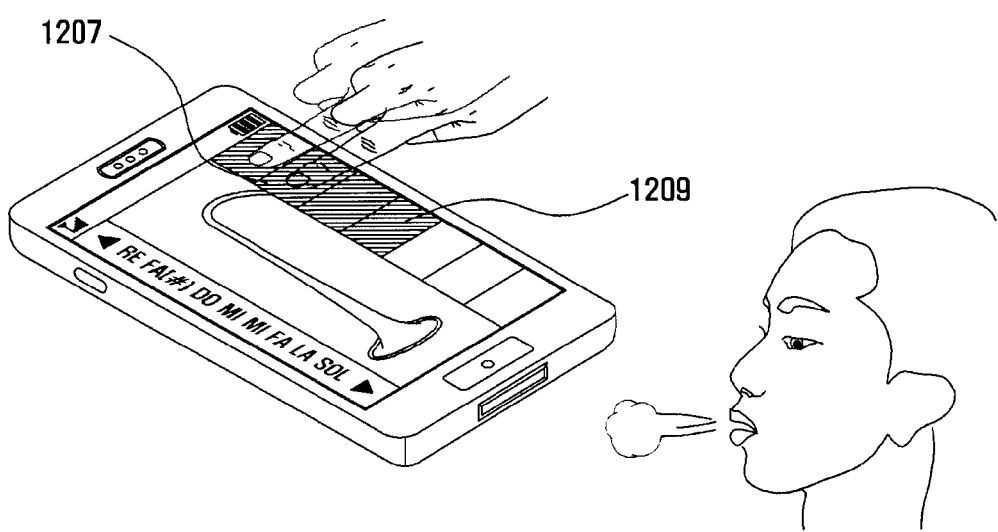

FIG. 11 illustrates a flow chart that describes a method for playing a trombone using a portable terminal 10, according to an exemplary embodiment of the present invention. FIG. 12A to FIG. 12C illustrate screens that describe a method for playing a trombone using a portable terminal 10, according to an exemplary embodiment of the present invention.

The portable terminal 10 allows a user to play the trombone through its musical instrument performance function, and the method for playing the trombone is explained in detail as follows, with reference to FIG. 11 and FIGS. 12A to 12C.

Referring to FIG. 11, the controller 100 executes a trombone performance mode according to a user selection (S1101). The controller 100 can detect whether a signal for selecting a piece of music to be played is input (S1103). The controller 100 can display a list of music that can be played through the trombone and provide information regarding music via a pre-listen function.

When the piece of music to be played has been selected at S1103, the controller 100 displays the seven positions of the trombone on the screen (S1105). The controller 100 can also display the title of the selected piece of music and a plurality of keys for playing the selected piece of music. For example, as illustrated in FIG. 12A, the controller 100 displays the seven positions of the trombone on the screen. The controller 100 also displays the title of a piece of music selected by the user and the 'Play' key 1203 on the screen. If a touch signal for selecting the 'Play' key 1203 is input, the controller 100 can control the portable terminal 10 to play the piece of music.

When the piece of music is played, the controller 100 can control the display unit 120 to highlight from the first position to a position to be first touched, from among the seven positions displayed on the screen (S1107). For example, as illustrated in FIG. 12B, the controller 100 highlights from the first position 'Do' to a position to be first touched, 'Re' button 1205. The controller can display notes of the piece of music to be played on the bottom portion of the screen in a slide format.

Next, the controller 100 detects whether a drag touch signal, dragging from the first position to a position of a note to be first touched, occurs (S1109). If the controller 100 determines that a drag touch signal has occurred from the first position to the position of the note to be first touched at S1109, it controls the portable terminal 10 to generate a vibration corresponding to the drag touch signal (S1111). That is, the controller 100 can allow the user to recognize that he/she correctly input the drag touch on the screen. On the contrary, if the controller 100 ascertains that the drag touch signal has not occurred from the first position to the position of the note to be first touched at S1109, it returns to S1107 and waits until the drag touch signal occurs on the position of the note to be first touched.

After generating a vibration at S1111, the controller 100 determines whether there is a note to be played, following the note of a position where the current touch signal has occurred (S1113). If the controller 100 determines that there is a note to be played, following the note of the position where the current touch signal has occurred at S1113, it controls the display unit 120 to highlight a position of a note following the note of the position where the current touch signal has occurred (S1115). For example, as illustrated in FIG. 12C, if the controller 100 detects the drag touch signal from the first position to a position 1207 to be currently touched, 'Re' position, it can highlight and display a position 1209 of the note to be played in the following, 'Fa' position, on the screen.

After that, the controller 100 determines whether a user audio signal is input (S1117). The user audio signal can be detected by the microphone 144 of the audio processing unit 140. When the audio signal has been detected at S1117, the controller 100 can measure the intensity of the audio signal input to the microphone 144 (S1119).

Next, the controller 100 can control the audio processing unit 140 to output audio source data corresponding to the touched position at which the touch signal is input (S1121). The controller 100 can control the audio processing unit 140 to analyze the touched position, extract corresponding audio source data, and output the audio source data associated with the intensity of the audio signal input to the microphone 144. On the contrary, if the audio signal has not been detected at S1117, the controller 100 returns to and proceeds with step S1115 where it controls the display unit 120 to highlight the position of the note following the note of the position where the current touch signal has occurred.

When outputting audio source data according to the touched position at S1121, the controller 100 detects whether the drag touch signal is generated at the following position (S1123). If the drag touch signal is generated at the following position at S1123, the controller 100 returns to and proceeds with step S1111 where it controls the portable terminal 10 to generate a vibration to inform the user that the position has been correctly touched.

Meanwhile, if the controller 100 determines that there is not a note to be played, following the note where the current touch signal has occurred at S1113, it displays a screen corresponding to an idle mode (S1125). The idle mode may further include a mode asking a user whether to one of resume and terminate the music performance if the music performance has one of ended or been stopped.

As described above, the portable terminal according to the present invention is equipped with a musical instrument function that can provide musical instruments that are similar to real musical instruments, and thus allows a user to easily appreciate the musical instrument performance. While a real musical instrument requires a relatively long period of time for a user to be able to skillfully play it, the portable terminal according to the present invention can allow users to easily play musical instruments using its musical instrument performance applications. In addition, the portable terminal can provide a screen showing musical instruments that are similar to real musical instruments, so that users can feel the same effect as the real musical instruments while they are playing the musical instruments displayed on the screen. The portable terminal can allow for musical instrument performance in concert if a plurality of users plays using different musical instruments provided by a plurality of portable terminals.

The above-described methods according to the present invention can be realized in hardware or as software or computer code that can be stored in a recording medium such as a CD ROM, a RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be understood that many variations and modifications of the basic inventive concept herein described, which may be apparent to those skilled in the art, will still fall within the spirit and scope of the present invention as defined in the appended claims.

What is claimed is:

1. A method for playing musical instruments using a portable terminal, comprising:
   executing a music performance mode;
   selecting at least one of a particular piece of music and a particular musical instrument displayed on a touch screen;
   receiving a first input signal as a touch signal from the touch screen for executing a music performance corresponding to the selected musical instrument;
   receiving a second input signal comprising an audio signal detected by an audio processing unit;
   analyzing both a particular position of the touch screen on which the touch signal is terminated and an intensity of the audio signal including a puffing of air into a microphone of the portable terminal, in order to determine a note corresponding to the analysis; and outputting audio source data based on a result of the analysis.

2. The method of claim 1, wherein the particular piece of music comprises at least one of:

music generated by a user in a composition mode; and
music stored in the portable terminal.

3. The method of claim 1, wherein the second input signal comprises:

the audio signal generated according to a puffing of air detected by a microphone coupled with the audio processing unit to play a wind instrument.

4. The method of claim 1, wherein executing a music performance mode further comprises:

executing, when a trumpet is selected as the particular musical instrument, a mode for playing the trumpet;
displaying a plurality of buttons corresponding to one octave on the touch screen;
highlighting one of the buttons to be touched; and
displaying notes of the selected particular piece of music on one side of the touch screen.

5. The method of claim 4, wherein, when a trumpet is selected as the particular musical instrument, receiving a first input signal further comprises:

determining, if a particular button is highlighted, whether a touch signal is input on the particular button;
executing a vibration function when the touch signal is correctly input;
determining whether there is a note to be touched, following the note of the particular button; and
highlighting, if there is a following note to be touched, a button corresponding to the following note.

6. The method of claim 1, wherein the touch signal is a drag touch signal, and executing a music performance mode further comprises:

executing, when a trombone is selected as the particular musical instrument, a mode for playing the trombone;
displaying a touch bar composed of a plurality of positions on the touch screen; and
highlighting at least one of the positions, from a first position to a particular position to be touched, among the displayed plurality of position on the touch bar.

7. The method of claim 1, wherein, the touch signal is a drag touch signal, when a trombone is selected as the particular musical instrument, receiving a first input signal further comprises:

displaying a plurality of buttons corresponding to one octave on the touch screen;

determining, if a particular position is highlighted, whether the drag touch signal is input at the particular position;
executing a vibration function when the touch signal is correctly input;
determining whether there is a note to be touched, following the note of the particular position; and
highlighting, if there is a following note to be touched, a position corresponding to the following note.

8. The portable terminal having a music performance function, comprising:

a touch screen configured to detect a first input signal as a touch signal, from the touch screen, in a music performance mode;
an audio processing unit configured to detect a second input signal as an audio signal, the second input signal including a puffing of air provided into a microphone; and
a processer configured to analyze both a note corresponding to a particular area on which the touch signal is terminated and an intensity of the audio signal, including the puffing of air, in association with each other and outputting audio source data corresponding to the analysis.

9. The portable terminal of claim 8, wherein the processor is configured to execute a trumpet performance mode, display a plurality of button corresponding to one octave on the touch screen, and highlight a button to be touched from among the buttons.

10. The portable terminal of claim 8, wherein the touch signal is a drag touch signal and the processor is configured to execute a trombone performance mode, display a touch bar comprising a plurality of positions on the touch screen, and highlight at least one of positions, from a first position to a particular position to be touched, among the plurality of positions displayed on the touch bar.

11. The portable terminal of claim 8, wherein the processor is configured to highlight a first button, and a position of the first button, executes a vibration function when the touch signal is correctly input to the highlighted first button, and position, and highlight a second button, and second position to be touched corresponding to an a note following the note of the first button.

12. The portable terminal of claim 8, wherein the audio processing unit detects a puffing of air to simulate performance of a wind instrument.

* * * * *